US011267307B2

(12) United States Patent
Lakehal-Ayat et al.

(10) Patent No.: US 11,267,307 B2
(45) Date of Patent: Mar. 8, 2022

(54) SUSPENSION SYSTEM USING OPTICALLY RECORDED INFORMATION, VEHICLES INCLUDING SUSPENSION SYSTEMS, AND METHODS OF USING SUSPENSION SYSTEMS

(71) Applicant: FORD GLOBAL TECHNOLOGIES, LLC, Dearborn, MI (US)

(72) Inventors: Mohsen Lakehal-Ayat, Aachen (DE); Uwe Hoffmann, Leverkusen (DE); Yvonne Baeumchen, Cologne (DE); Felix Weinreich, Cologne (DE); Michael Seemann, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 85 days.

(21) Appl. No.: 16/559,261

(22) Filed: Sep. 3, 2019

(65) Prior Publication Data
US 2020/0016952 A1 Jan. 16, 2020

Related U.S. Application Data (62) Division of application No. 14/678,756, filed on Apr. 3, 2015, now Pat. No. 10,406,882.

(30) Foreign Application Priority Data

Apr. 4, 2014 (DE) .................. 102014206481.3

(51) Int. Cl.
*B60G 17/016* (2006.01)
*B60G 17/018* (2006.01)
(Continued)

(52) U.S. Cl.
CPC ......... *B60G 17/016* (2013.01); *B60G 17/018* (2013.01); *B60G 17/0155* (2013.01);
(Continued)

(58) Field of Classification Search
CPC ............. B60G 17/018; B60G 17/0165; B60G 2400/102; B60G 2500/10; B60G 17/0195;
(Continued)

(56) References Cited

U.S. PATENT DOCUMENTS 4,657,280 A 4/1987 Ohmori
4,674,767 A 6/1987 Kuroki et al.
(Continued)

FOREIGN PATENT DOCUMENTS

CN 102292249 A 12/2011
CN 103209844 A 7/2013
(Continued)

OTHER PUBLICATIONS

Final Office Action in U.S. Appl. No. 14/246,793, dated Nov. 14, 2018.
(Continued)

*Primary Examiner* — Alexander G Kalinowski
*Assistant Examiner* — Sanjeev Malhotra
(74) *Attorney, Agent, or Firm* — Burr & Forman, LLP (57) ABSTRACT

A method for controlling a suspension system of a vehicle, as well as suspension systems, and a vehicle including a suspension system is provided. The suspension system may include at least one adjustable damping device that is controlled via a control signal, such as from a controller of the suspension system, in order to dynamically adjust the damping characteristic of the damping device. The control signal may be generated on the basis of at least one of current driving dynamics data and optically recorded information about an area of a ground surface.

13 Claims, 6 Drawing Sheets (51) Int. Cl.
*B60G 17/015* (2006.01)
*B60G 17/0165* (2006.01)
*B60G 17/06* (2006.01)

(52) U.S. Cl.
CPC ..... *B60G 17/0165* (2013.01); *B60G 17/0182* (2013.01); *B60G 17/06* (2013.01); *B60G 2204/62* (2013.01); *B60G 2400/102* (2013.01); *B60G 2400/202* (2013.01); *B60G 2400/252* (2013.01); *B60G 2400/82* (2013.01); *B60G 2400/821* (2013.01); *B60G 2401/14* (2013.01); *B60G 2401/142* (2013.01); *B60G 2401/21* (2013.01); *B60G 2500/10* (2013.01); *B60G 2800/70* (2013.01)

(58) Field of Classification Search
CPC .......... B60G 2500/20; B60G 2400/204; B60G 2400/82; B60G 2400/252; B60G 17/015; B60G 17/016; B60G 17/02; B60G 17/06; B60G 17/08; B60G 2400/106; B60G 2400/821; B60G 2500/30; B60G 17/019; B60G 2400/104; B60G 2401/14; B60G 2401/21; B60G 2202/413; B60G 2400/0521; B60G 2400/0523; B60G 2400/20; B60G 2400/41; B60G 2401/16; B60G 2600/14; B60G 2600/16; B60G 2600/184; B60G 2600/60; B60G 13/14; B60G 17/0152; B60G 17/0182; B60G 17/0272; B60G 2202/154; B60G 2202/32; B60G 2400/0522; B60G 2400/202; B60G 2400/206; B60G 2400/25; B60G 2400/52; B60G 2400/60; B60G 2400/91; B60G 2400/96; B60G 2401/142; B60G 2401/174; B60G 2401/176; B60G 2500/102; B60G 2500/104; B60G 2600/182; B60G 2600/70; B60G 2600/90; B60G 2800/162; B60G 2800/70; B60G 2800/85; B60R 21/0134; B60T 8/172; B60T 8/17551; B60W 10/20; B60W 10/22; B60W 2420/42; B60W 40/068; B60W 40/10; B62D 6/003; B62K 2025/044; B62K 25/04; F16F 9/512; F16F 9/535; G01S 17/88; G01S 17/931; G06K 9/00798; G06T 2207/30256
USPC .............. 701/1, 31.4, 37, 38, 48, 49, 52, 70; 700/245; 702/167; 370/400; 280/5.5, 280/5.512, 5.515, 5.518; 303/20; 180/41
See application file for complete search history.

(56) References Cited

U.S. PATENT DOCUMENTS

| | | |
|---|---|---|
| 4,696,489 A | 9/1987 | Fujishiro et al. |
| 4,714,271 A | 12/1987 | Buma et al. |
| 4,717,173 A | 1/1988 | Sugasawa et al. |
| 4,728,120 A | 3/1988 | Buma et al. |
| 4,733,883 A | 3/1988 | Sugasawa et al. |
| 4,744,589 A | 5/1988 | Buma et al. |
| 4,749,210 A | 6/1988 | Sugasawa |
| 4,770,438 A | 9/1988 | Sugasawa et al. |
| 4,861,067 A | 8/1989 | Booher |
| 4,899,296 A | 2/1990 | Khattak |
| 4,936,604 A | 6/1990 | Kawagoe et al. |
| 5,016,908 A | 5/1991 | Athanas et al. |
| 5,058,017 A | 10/1991 | Adachi et al. |
| 5,067,687 A | 11/1991 | Patel et al. |
| 5,123,671 A | 6/1992 | Driessen et al. |
| 5,163,319 A | 11/1992 | Spies et al. |
| 5,193,844 A | 3/1993 | Butsuen et al. |
| 5,203,584 A | 4/1993 | Butsuen et al. |
| 5,218,546 A * | 6/1993 | Bradshaw ............ B60G 17/018 701/37 |
| 5,269,557 A | 12/1993 | Butsuen et al. |
| 5,347,457 A | 9/1994 | Tanaka et al. |
| 5,439,245 A * | 8/1995 | Breitenbacher ...... B60G 17/018 280/5.515 |
| 5,450,322 A * | 9/1995 | Tanaka .................... G01S 15/88 701/37 |
| 5,483,450 A * | 1/1996 | Titli .................... B60G 17/018 180/41 |
| 5,671,142 A | 9/1997 | Tatarazako |
| 5,931,879 A * | 8/1999 | Neumann ............ B60G 17/018 701/37 |
| 6,019,495 A | 2/2000 | Yamada et al. |
| 6,122,578 A | 9/2000 | Knolle |
| 6,233,510 B1 | 5/2001 | Platner et al. |
| 6,385,529 B1 | 5/2002 | Minowa et al. |
| 6,456,194 B1 | 9/2002 | Carlson et al. |
| 7,587,267 B2 | 9/2009 | Mori et al. |
| 7,909,417 B2 | 3/2011 | Wang et al. |
| 8,311,734 B2 | 11/2012 | Georgis et al. |
| 8,451,140 B2 | 5/2013 | Piccinini et al. |
| 8,630,795 B2 | 1/2014 | Breed et al. |
| 8,840,118 B1 * | 9/2014 | Giovanardi .......... B60G 17/016 280/5.5 |
| 8,892,304 B2 | 11/2014 | Lu et al. |
| 9,008,858 B1 | 4/2015 | Payne et al. |
| 9,262,763 B2 | 2/2016 | Peter et al. |
| 9,592,714 B2 * | 3/2017 | Liu ...................... B60G 17/015 |
| 9,950,585 B2 * | 4/2018 | Gohrle ................. B60G 17/018 |
| 2003/0004614 A1 * | 1/2003 | Schmitt ............... B60C 23/0408 701/1 |
| 2004/0012162 A1 | 1/2004 | Burke |
| 2004/0064240 A1 | 4/2004 | Sugano |
| 2004/0094912 A1 * | 5/2004 | Niwa ................... B60G 17/0165 280/5.518 |
| 2005/0001472 A1 * | 1/2005 | Bale ...................... B60T 17/221 303/20 |
| 2005/0080530 A1 * | 4/2005 | Arduc .................. B60G 15/063 701/37 |
| 2005/0107916 A1 * | 5/2005 | Nagasaka ............ B62D 57/032 700/245 |
| 2005/0113998 A1 * | 5/2005 | Kim ..................... B60G 17/06 701/37 |
| 2005/0209742 A1 | 9/2005 | Sakakibara et al. |
| 2005/0218718 A1 | 10/2005 | Iwatsuki et al. |
| 2005/0234620 A1 * | 10/2005 | Roll .................... B60G 17/0195 701/37 |
| 2005/0288891 A1 * | 12/2005 | Masuyama ............ E01C 23/01 702/167 |
| 2006/0064223 A1 * | 3/2006 | Voss ...................... B62K 25/04 701/52 |
| 2006/0074533 A1 | 4/2006 | Karaba et al. |
| 2006/0215020 A1 | 9/2006 | Mori et al. |
| 2006/0243548 A1 | 11/2006 | Stein et al. |
| 2006/0287790 A1 * | 12/2006 | Seifert .................. B60G 17/06 701/37 |
| 2007/0088464 A1 | 4/2007 | Coates |
| 2007/0217433 A1 * | 9/2007 | Doppler .............. H04B 7/15528 370/400 |
| 2008/0015743 A1 | 1/2008 | Haug |
| 2008/0079280 A1 | 4/2008 | Nakamura et al. |
| 2008/0133066 A1 * | 6/2008 | Takenaka ............... B62D 6/003 701/1 |
| 2008/0275606 A1 * | 11/2008 | Tarasinski ............ B60G 99/008 701/37 |
| 2009/0043452 A1 | 2/2009 | Sekiya |
| 2009/0043458 A1 * | 2/2009 | Kamioka .............. B60Q 1/085 701/49 |
| 2009/0088918 A1 * | 4/2009 | Takenaka ............. B60W 40/08 701/31.4 |
| 2009/0097038 A1 | 4/2009 | Higgins-Luthman et al. |
| 2009/0105921 A1 | 4/2009 | Hanatsuka et al. |
| 2009/0143945 A1 * | 6/2009 | Steinle ................... B60T 8/172 701/48 |
| 2009/0287368 A1 | 11/2009 | Bonne |

(56) References Cited

U.S. PATENT DOCUMENTS

| | | |
|---|---|---|
| 2009/0299857 A1 | 12/2009 | Brubaker |
| 2009/0302557 A1* | 12/2009 | Hara ................. F16F 9/125 280/5.512 |
| 2010/0042292 A1 | 2/2010 | Schindler et al. |
| 2010/0082216 A1 | 4/2010 | Yasui et al. |
| 2010/0138108 A1 | 6/2010 | Kajino |
| 2011/0084503 A1 | 4/2011 | Li et al. |
| 2011/0137508 A1 | 6/2011 | Garcia Manchado |
| 2011/0282516 A1* | 11/2011 | Lich ..................... B60W 50/14 701/1 |
| 2012/0316746 A1 | 12/2012 | Park |
| 2013/0103259 A1 | 4/2013 | Eng et al. |
| 2013/0345933 A1 | 12/2013 | Norton et al. |
| 2014/0163837 A1 | 6/2014 | Um et al. |
| 2014/0195112 A1* | 7/2014 | Lu ..................... B60G 17/0165 701/37 |
| 2014/0195114 A1* | 7/2014 | Tseng ................. B60G 17/0165 701/37 |
| 2014/0303844 A1* | 10/2014 | Hoffmann ............. B60G 17/02 701/37 |
| 2014/0330483 A1* | 11/2014 | Lu ........................ B60G 17/02 701/37 |
| 2015/0046084 A1 | 2/2015 | Choi et al. |
| 2015/0088378 A1* | 3/2015 | Sugai ................. B60G 17/0165 701/37 |
| 2015/0166072 A1 | 6/2015 | Powers et al. |
| 2015/0174981 A1* | 6/2015 | Buma ................. G06K 9/00798 701/38 |
| 2015/0246672 A1 | 9/2015 | Pilutti et al. |
| 2015/0274028 A1 | 10/2015 | Payne et al. |
| 2015/0274030 A1 | 10/2015 | Payne et al. |
| 2016/0144861 A1 | 5/2016 | Cao et al. |
| 2016/0253575 A1* | 9/2016 | Kakegawa ......... G06K 9/00791 701/70 |
| 2016/0339987 A1* | 11/2016 | Walthert .................. F16F 9/46 |
| 2017/0106855 A1 | 4/2017 | Lavoie et al. |
| 2018/0154723 A1* | 6/2018 | Anderson ............ B60G 17/015 |
| 2019/0001782 A1* | 1/2019 | Anderson ............ B60G 17/019 |

FOREIGN PATENT DOCUMENTS

| | | |
|---|---|---|
| CN | 103507588 A | 1/2014 |
| DE | 4119494 A1 | 1/1992 |
| DE | 4117091 A1 | 11/1992 |
| DE | 102006039353 A1 | 3/2008 |
| DE | 102009009063 A1 | 10/2009 |
| DE | 102008032545 A1 | 1/2010 |
| DE | 102009021107 A1 | 11/2010 |
| DE | 102010029947 A1 | 12/2011 |
| DE | 102010044263 A1 | 3/2012 |
| DE | 102013211285 A1 | 1/2014 |
| DE | 102013018927 A1 | 5/2015 |
| KR | 20130000125 A | 1/2013 |
| WO | 89/04498 A1 | 5/1989 |

OTHER PUBLICATIONS

Notification of Second Office Action in CN Appln No. 201510160718.1, dated Mar. 13, 2019.

Notice of Allowance in U.S. Appl. No. 14/246,793, dated Mar. 18, 2019.

Notification of First Office Action in CN Application No. 201510160718.1 dated May 21, 2018.

Non-Final Office Action in U.S. Appl. No. 14/887,934, dated Nov. 25, 2016.

Notice of Allowance in U.S. Appl. No. 14/887,934, dated May 2, 2018.

Non-Final Office Action in U.S. Appl. No. 14/246,793, dated Apr. 6, 2018.

Final Office Action in U.S. Appl. No. 14/887,934, dated Mar. 8, 2017.

Non-Final Office Action in U.S. Appl. No. 14/887,934, dated Sep. 26, 2017.

Final Office Action in U.S. Appl. No. 14/887,934, dated Feb. 7, 2018.

Ramsundar K. Ganesan, et al., "An Image Processing Approach to Detect Obstacles on Road", SAE International, published Jan. 14, 2015, 7 pgs.

Hua-Tsung Chen, et al.; "Vision-Based Road Bump Detection Using a Front-Mounted Car Camcorder", 2014 22nd International Conference on Pattern Recognition, IEEE Computer Society, pp. 4537-4542.

Examination Report issued in corresponding German Patent Application No. 10 2013 206 109.9, dated Jan. 7, 2014.

Non-Final Office Action dated Oct. 9, 2015 from related U.S. Appl. No. 14/246,793.

Final Office Action dated Apr. 29, 2016 from related U.S. Appl. No. 14/246,793.

Non-Final Office Action dated Nov. 18, 2016 from related U.S. Appl. No. 14/246,793.

Final Office Action dated May 16, 2017 from related U.S. Appl. No. 14/246,793.

Examination Report in DE Appln No. 10 2014 206 481.3 dated Mar. 12, 2014.

* cited by examiner

SUSPENSION SYSTEM USING OPTICALLY RECORDED INFORMATION, VEHICLES INCLUDING SUSPENSION SYSTEMS, AND METHODS OF USING SUSPENSION SYSTEMS

CROSS REFERENCE TO RELATED APPLICATIONS

This application is a Divisional of U.S. application Ser. No. 14/678,756, filed Apr. 3, 2015, and claims priority to German Application No. 10 2014 206 481.3, filed on Apr. 4, 2014, the contents of each of which are hereby incorporated by reference in their entirety.

TECHNICAL FIELD

The present disclosure relates to suspension systems using optically recorded information, as well as vehicles including such suspension systems and methods of using the suspension systems.

BACKGROUND

Suspension systems used in vehicles are mainly used to decouple the vehicle structure from a ground surface on which a vehicle travels, and to balance wheel loads. Damping devices, such as shock absorbers, are typically used for this purpose. Besides conventional (passive) damping devices, such as shock absorbers, active damping devices may be used. Passive damping devices are a compromise between the requirements for vehicle stability, vehicle safety, and vehicle comfort. Active damping devices, in contrast, have the advantage that their damping behavior can be varied during operation. Although such passive and active damping devices have been effective in decoupling a vehicle structure from a ground surface, further improvements may be made to suspension systems that include such damping devices.

SUMMARY

In accordance with various exemplary embodiments, the present disclosure provides a method of controlling a suspension system for a vehicle. The method comprises inputting first control information based on current driving dynamics data, inputting second control information, based on optically recorded information about a ground surface area the vehicle will travel, to a controller for the suspension system, generating a control signal with the controller, based on at least one of the first control information and the second control information, and controlling at least one adjustable damping device of the suspension system to dynamically adjust a damping characteristic of the at least one damping device.

In accordance with various exemplary embodiments, the present disclosure further provides a suspension system comprising a visual system, at least one adjustable damping device having an adjustable damping characteristic, and a controller. The visual system is configured to record optical information of a ground surface area a vehicle will travel. The controller is configured to receive first control information based on current driving dynamics data detected by at least one vehicle sensor and receive second control information based on the optically recorded information. The controller is further configured to generate a control signal based on at least one of the first and second control information to control the at least one adjustable damping device.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the present disclosure are explained in detail below using an exemplary embodiment illustrated in the following figures. In the figures.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The various exemplary embodiments described herein contemplate systems and methods of controlling a vehicle suspension system, such as a vehicle suspension system including one or more damping devices. According to an exemplary embodiment, a first control term is calculated on the basis of current vehicle driving dynamics data and a second control term is calculated on the basis of optically recorded information, which can be obtained by a visual system of a vehicle. A control term may be, for example, a calculation based upon one or more variables. A control term may also be referred to as control information herein. Both the first control term and the second control term are input to a low-level controller for a vehicle suspension system, which generates a control signal for controlling the vehicle suspension system on the basis of at least one of the first control term and the second control term.

A fully active damping device includes an actuator that simultaneously provides the forces that are otherwise separately provided by a shock absorber. For example, a fully active suspension may include an active damping device and an active spring. A fully active suspension system may independently raise or lower a body of a vehicle at each wheel. A semi-active suspension, which may also be referred to as an adaptive suspension, may control a characteristic of an actuator, such as a damping characteristic of a damping device (e.g., independently at each wheel), to dampen of forces applied to the suspension. In other words, a semi-active, or adaptive, suspension may adjust the firmness of an actuator, such as a damping device, to affect the quality of a ride without raising or lowering a vehicle body relative to the vehicle wheels. According to an exemplary embodiment, a damping device of a semi-active, or adaptive, suspension may be, for example, a hydraulically-actuated cylinder, a cylinder actuated by solenoid valves or electromagnetically energized proportional-action valve, a cylinder incorporating a magneto-rheological fluid, or any other suitable type of active cylinder or shock-absorber familiar to one of ordinary skill in the art. In one example, a cylinder includes upper and lower fluid chambers interconnected via a variable orifice, the size of which may be adjusted by controlling a motor. A semi-active, or adaptive, suspension may include, for example, an active damping device but not an active spring.

In comparison to semi-active, or adaptive, suspensions, fully active suspensions, however, require high actuating energy in order to produce the necessary force in both directions, such as between the vehicle structure and a wheel of the vehicle. Controls that facilitate stability of a vehicle via active damping devices are also desirable. For example, semi-active suspension devices enable the construction of a stable suspension system, because the structural manner and operation thereof provides force generation that is opposite to a respective direction of motion. The present disclosure further contemplates other suspension systems, such as, for example, fast active systems, active roll control systems, adaptive air spring systems, and fully active suspensions systems. According to an exemplary embodiment, a fast active system is the combination of an active damping device and a passive suspension spring.

Therefore, the present disclosure contemplates the use of semi-active suspension actuators (also referred to as adaptive suspension actuators), which are generally referred to as damping devices for the various exemplary embodiments described herein. In view of this, suspension systems described herein may include, for example, a semi-active suspension actuator (also referred to as adaptive suspension actuators), generally referred to as a damping device, but not an active spring. A particular damping device may be selected in view of a respective intended use and the requirements of that use.

Although suspension systems with active damping devices may be viewed as a mature and popular technology, such systems may benefit from efforts to make systems using damping devices more efficient and affordable. For example, a suspension system may use sensor-detected driving dynamics data, especially the movements of at least one wheel, as a starting basis for control of a suspension system. A corresponding control signal based on the sensor-detected may be calculated in real time, with which an active damping device is ultimately controlled. However, the regulation of the suspension system effectively lags the real conditions when relying on sensor-detected driving dynamics data. Thus, improvements to suspension systems in which lag is minimized or eliminated (i.e., system with increased response time) would increase the efficiency of such suspension systems.

Against this background, the present disclosure contemplates suspension systems that can be controlled in a manner that enables a faster response to real conditions, as compared to conventional systems, whereby the stability, safety, and comfort of the vehicle can be increased. Such suspension systems enhance the stability, safety, and comfort during operation due to faster adaptation to real conditions. Further, the present disclosure contemplates vehicles include such suspension systems and methods of using the suspension systems.

The various exemplary embodiments described herein may be implemented with a vehicle, such as, for example, a motor vehicle. The suspension system may include at least one adjustable damping device. The at least one adjustable damping device may be controlled with a control signal (e.g., a control signal generated by a controller for a suspension system) in order to dynamically adjust a damping characteristic of the damping device. The controller may be dedicated to control of only the suspension system or the controller may be a section of a vehicle controller used to control various systems of a vehicle. The configuration of the controller is subject to a variety of implementation-specific variations. For example, in some embodiments, the functions described in reference to the controller may be performed across multiple control units or among multiple components of a single controller. Further, the controller may include one or more structural components (e.g., microprocessors) that provide the function of a controller. Any controllers or processors disclosed herein, may include one or more non-transitory, tangible, machine-readable media, such as read-only memory (ROM), random access memory (RAM), solid state memory (e.g., flash memory), CD-ROMs, hard drives, universal serial bus (USB) drives, any other computer readable storage medium, or any combination thereof. The storage media may store encoded instructions, such as firmware, that may be executed by a control system or controller to operate the logic or portions of the logic presented in the methods disclosed herein. For example, in certain embodiments, the controller may include computer code disposed on a computer-readable storage medium or a process controller that includes such a computer-readable storage medium. The computer code may include instructions, for example, for controlling a suspension system according to the various exemplary embodiments described herein.

According to an exemplary embodiment, both current driving dynamics data and optically recorded information are input to a controller configured to control a suspension system. The controller may be configured to generate a control signal used to control the suspension system. Thus, the generation of the control signal may be based both on respective current driving dynamics data and also on optically recorded information about an area of a ground surface. However, the present disclosure contemplates embodiments in which both current driving dynamics data and optically recorded information are input to the controller but the control signal output by the controller is based on only one of the current driving dynamics data and the optically recorded information. For instance, current conditions, such as, for example, the turning of the vehicle (e.g., yaw rate), the operability of the vision system, height points derived from optically recorded information (e.g., height points indicating an irregularity in the ground surface, such as a pothole, bump, or other ground surface irregularity), or other conditions, may cause the controller to favor one input over the other, such as by providing more weight to one of the inputs or ignoring one input altogether. As such, the relative weighting of a first control term to a second control term may range from an equal weighting (i.e., an average or each control term having fifty percent weight) to one of the first control term or the second control term having zero weight (i.e., zero percent of the relative weighting) and the other of the first control term or the second control term having all weight (i.e., one hundred percent of the relative weighting). According to an exemplary embodiment, the controller may provide more weight to the input from the current driving dynamics data (e.g., the first control term), or provide no weight to the input from the optically recorded information (e.g., the second control term) when a vehicle is turning at a sharp angle (e.g., has a high yaw rate) or when the visual system is obstructed or otherwise non-operational. Further, the controller may provide more weight to the input from the optically recorded information (e.g., the second control term), or provide no weight to the current driving dynamics data (e.g., the first control term), when height points derived from the optically recorded information indicate an irregularity (e.g., a pothole, bump, or other ground surface irregularity) in a ground surface the vehicle is to travel on.

The information about an area of a ground surface obtained by visual system may be information that contains evidence about at least an area of a ground surface surrounding the vehicle, such as the composition of the area of the ground surface. According to an exemplary embodiment, the area of a ground surface surrounding the vehicle is located outside the contact regions of the moving vehicle (e.g., wheels) with the ground surface. The information obtained in this way about the respective area of a ground surface may be used to enable the preparation of the suspension system, such as by preparing one or more damping devices of the suspension system. In other words, the various exemplary embodiments described herein provide the possibility of expanding upon control of a suspension system by using not only the current driving dynamics data (e.g., current driving dynamics data obtained from vehicle sensors) but also using information that does not directly relate to the respective damping device. Such information may not directly relate to a current state of the vehicle, such as the displacement of the vehicle body, but relates to the vehicle state or at least can relate to it in the future. The information can be, for example, optically recorded information about an area of a ground surface obtained from a visual system of a vehicle.

By using optically recorded information about an area of a ground surface as an input to a suspension system controller, a damping characteristic of a suspension system damping device may be adapted more quickly to changing road conditions, such as when an irregularity in the ground surface (e.g., pothole, bump, or other ground surface irregularity) is encountered. Thus, a suspension system may be controlled in a proactive manner by using the optically recorded information, which facilitates faster response by a vehicle suspension system to real conditions. As a result, vehicle stability, safety, and comfort are enhanced.

Because the information about the respective area of a ground surface through which the travelling vehicle passes is continually changing, the information can preferably be temporarily stored, such as, for example, in an electronic memory of the suspension system controller or accessible by the controller, according to an exemplary embodiment. The optical information may be recorded by a visual system of a vehicle, which may be considered part of a suspension system or a separate system in signal communication with at least the controller of the suspension system.

According to an exemplary embodiment, the visual system includes at least one camera disposed on the vehicle. The camera includes at least one image-processing sensor, such as, for example, a charge coupled device (CCD), a complementary metal-oxide semiconductor (CMOS) type sensor, or unique or multilayer image sensor. The at least one camera may be a multi-focal camera, a stereo camera or a mono camera or combinations thereof. According to an exemplary embodiment, the visual system includes a LIDAR system or a LADAR system, or combinations thereof, such as, for example, with each other and/or with a camera. These light or laser radiation emitting or capturing systems may be used for distance measurements between a vehicle and any relevant points of the ground. Further the light or laser radiation emitting or capturing systems may be used for generating an image of an area of a ground surface. Thus, optical information can be obtained by using a visual system of a vehicle that includes one or more cameras, laser systems, and/or radar systems.

All previously described systems and arrangements for obtaining optical information are referred to as visual systems within the context of the present disclosure. According to an exemplary embodiment, a visual system used to record visual information is already present in a vehicle. According to an exemplary embodiment, the visual system may include its own internal process algorithm(s) and suitable computing capacity, such as to provide a depth matrix at each sampling point in time. The depth matrix is an image that contains information relating to the distance of the surfaces of observed objects from a viewpoint, according to an exemplary embodiment. The viewpoint for such an image may be, for example, the viewpoint of the visual system, such as the viewpoint of a camera.

In the case of a stereo camera of a visual system, the two images of the essentially mutually parallel cameras are acquired simultaneously but separately from each other and are combined to obtain information about the depth of the surroundings of the vehicle, such as in the form of a depth matrix. The depth matrix can then be used to recognize elevations at specific regions of a ground surface in the combined images. Various techniques may be used to calculate the depth matrix from two or more images, which are familiar to one of ordinary skill in the art.

The visual system may be a system that is already present in a vehicle. By using a system already present in the vehicle, as well as sensors already present in the vehicle for determining current driving dynamics data, the various exemplary embodiments described herein can be retrofit with little effort. In the case of vehicles that already comprise a suitable visual system and active damping device, sometimes only an adjustment in the calculation or generation of the control signal (e.g., algorithms used by a controller of a suspension system) may be necessary. Thus, optically recorded information may then be appropriately processed, such as by the suspension system controller, in order to be available as a further basis to generate a control signal to control a vehicle suspension system in accordance with the present teachings.

According to an exemplary embodiment, an expected displacement of a structure (e.g., a body) of the vehicle is estimated from the current driving dynamics data. A control term is generated on the basis of the current driving dynamics data and may be referred to as a first control term. A first control term for a control signal used to control a suspension system, such as an adjustable damping device of a suspension system, may be initially calculated on the basis of the expected displacement of the vehicle structure and estimated in this manner. If the optically recorded information contains no relevant information about any potentially necessary adjustment of the suspension system, such as an adjustment to the damping characteristic of the adjustable damping device (e.g., no adjustment is needed on the basis of the optically recorded information which shows area surrounding vehicle, including any potential changes in surface roughness of a road surface or a road surface irregularity), the first control term can be used in order to generate a suitable control signal.

One or more sensors used to estimate suspension movements of a vehicle body may be used to obtain driving dynamics data for calculating a control signal, such as on the basis of a first control term for a damping device. The calculation may take place on the basis of displacement variables, such as roll, pitch, and displacement in the vertical direction of the vehicle. Besides recording the displacement variables via corresponding sensors, a pitching rate of the vehicle can also be calculated on the basis of the recorded driving dynamics data. A central measurement unit, such as an electronic memory, can be used to record the driving dynamics data collected from one or more vehicle sensors.

According to an exemplary embodiment, an absolute height profile of an area of a ground surface depicted in the optical recorded information is initially calculated from the optically recorded information. The height profile can be used to simplify driving states that involve potentially relevant height points of the recorded area of a ground surface for control of a vehicle suspension system. For example, a second control term can be calculated on the basis of relevant height points of the absolute height profile that differ from each other in their respective height positions. A control term generated on the basis of the optically recorded information may be referred to as a second control term. The second control term can be used to generate a control signal for control of a vehicle suspension system, such as upon the basis of only the second control term or on the basis of the second control term and the first control term. The controller for a suspension system may provide, for example, more weight to the input from the second control term, or provide no weight to the current driving dynamics data (e.g., the first control term), when height points derived from the optically recorded information indicate an irregularity (e.g., a pothole, bump, or other ground surface irregularity) in a ground surface the vehicle is to travel on.

According to an exemplary embodiment, both control terms (i.e., the first control term and the second control term) are used to generate a control signal for controlling a vehicle suspension system, such as an adjustable damping device of the suspension system. Thus, the present disclosure contemplates a semi-active suspension system in which the damping device, such as, for example, an adjustable damping device of the suspension system, uses both current driving dynamics data (e.g., data based on output from one or more vehicle sensors) and optically recorded information as inputs to its controller, which issues a command signal to control the suspension system on the basis of one or both of the current driving dynamics data and the optically recorded information.

According to an exemplary embodiment, the optically recorded information is obtained from an area of a ground surface disposed within a detection region in front of the vehicle. According to an exemplary embodiment, the optically recorded information is obtained around the vehicle. In this manner, the optically recorded information can be used to respond to a displacement of the vehicle in every possible direction, so that the associated damping device of a suspension system can be controlled, even in the case of reversing the travel direction of the vehicle, by using control signals based on the optically recorded information. Because vehicles normally travel in a straight line, at least each area of a ground surface in front of the vehicle is recorded using a visual system of the vehicle.

To facilitate the determination of a height of a ground surface and/or a distance to a ground surface observed in optically recorded information, the visual system can be attached to the vehicle at a previously determined height and/or horizontal distance from the center of gravity of the vehicle. The images obtained with the visual system can be used, for example, to estimate the average height profile of a ground surface, such as in a specified detection region of the visual system. A relative height profile for the ground surface can be generated, for example, by grouping all recorded average height points for a ground surface within the detection region of the visual system. According to an exemplary embodiment, a Reference Road Plan may be generated. The Reference Plan can be, for example, an average plan containing the maximum road points observed by a visual system and/or wheel road contact points.

According to an exemplary embodiment, the distance of a detection region for a visual system (e.g., distance to a ground surface recorded by a visual system), relative to the vehicle, can be varied, as may be desired. The distance to a detection region for a visual system can be varied, for example, as vehicle speed varies. For instance, a distance in front of a vehicle at which the visual system observes and records a ground surface in a detection region may be increased as vehicle speed increases in order to provide a sufficient period of time for the calculation of the second control term for controlling the suspension system.

The height profile of the ground surface thus may cover a path for the front wheels of a vehicle on a road surface. The respective distance between relevant height points and the front wheels of the vehicle, which is provided by the visual system, can be relevant to the path of the front wheels because the optically recorded information can be used to determine if the calculated height profile of the ground surface indicates that the front wheels of the vehicle will encounter a variation in the road surface, such as, for example, a pothole. Thus, the visual system and its optically recorded information may be used to provide an accurate estimation of when a respective height point is reached.

Because the visual system, and thus its optically recorded information, is subjected to the movements of the vehicle body while travelling, the optically recorded information sometimes may not be suitable for direct use, such as to provide a realistic estimation of the true nature of the ground surface to be travelled by a vehicle. According to an exemplary embodiment, an absolute height profile used for the calculation of the second control term can be based on a previously calculated relative height profile, such as a relative height profile calculated during a previous control loop or iteration. According to another exemplary embodiment, an absolute height profile may be determined by processing optically recorded information obtained by a visual system of a vehicle. For instance, a relative height profile may be determined on the basis of height profiles determined from the optically recorded information, which may be affected by the movements of a vehicle body. To address this, the relative height profile may be reprocessed to obtain an absolute height profile. The reprocessing may compensate for movements of the vehicle structure and/or of the vehicle, such as, for example, pitching, rolling, and/or vertical movements. According to an exemplary embodiment, only the absolute height profile, such as the absolute height profile obtained via the reprocessing discussed above, is used as the basis to calculate the second control term because only the absolute height profile contains an adjusted model of the real ground surface in which height point can be properly identified.

According to an exemplary embodiment, the time to reach a relevant height point of a ground surface with a wheel of the vehicle associated with the damping device is calculated depending on the direction of travel and/or the speed of the vehicle. In other words, the time at which the associated wheel just reaches the height point is calculated on the basis of the speed and/or the direction of travel of the vehicle in relation to the recorded height points. The second control term may be used by the controller of the vehicle suspension system to generate a control signal for the suspension system upon reaching the height point, such as to adjust a damping characteristic of a damping device of the suspension system according to the current ground conditions at that time (e.g., the ground conditions indicated by the optically recorded information) and/or the current driving dynamics.

In the case of further travel, height points between the detection region and the wheel associated with the damping device that are outside of the detection region, and are thus lacking, may be reconstructed via a suitable calculation. In this manner, the previously recorded height points are available at any point in time, including up to at least respective height points so they may be appropriately taken into account during the generation of a control signal for a vehicle suspension system. This part of the system facilitates building a map of a road elevation while the vehicle is moving forward or backward.

According to an exemplary embodiment, the inputs for the rolling movements of at least one wheel on the ground may be used to generate an appropriate control signal on the basis of the first control term. Therefore, the suspension system may be controlled without use of the second control term, such as in the absence of information about the future ground to be travelled (e.g., in the absence of optically recorded information obtained via a visual system). For example, when the visual system is not functional (e.g., visibility is poor, an optical sensor is blocked, or other technical difficulty) or when the visual system is otherwise unable to observe the path upon which the vehicle is traveling (e.g., when the vehicle is making a sharp turn and the visual system is oriented for a generally straight path in front of the vehicle), a controller for a vehicle suspension may generate a control signal to control the suspension system based upon the current driving dynamics data (e.g., the first control term) and provide less weight or no weight to the optically recorded information (e.g., the second control term). However, by using both the first control term and the second control term, based on previously optically recorded information, to control a vehicle suspension, the influence of ground roughness on the vehicle body and the influence of wheel movements can be further minimized.

By using the various exemplary embodiments described herein, control of a regulated suspension system, such as a suspension system including an active damping device, is facilitated, whereby the stability, safety, and comfort of the vehicle can be enhanced. For instance, the visual system may be used to provide a preview of a ground surface to enable a faster response by the vehicle suspension to real conditions of the ground on which the vehicle travels. In this way, the controller of the vehicle suspension not only responds to the current recorded respective driving dynamics data, but is supplied with previously optically recorded information at a correct point in time, so that the optically recorded information can also be taken into account when generating a control signal for the suspension system.

The present disclosure also relates to a suspension system for a vehicle that is combined with a visual system as previously described. The suspension system of the vehicle may be configured and used according to the various exemplary embodiments described herein. In the various exemplary embodiments described herein, a suspension system may be any of the following systems: an active damping system, a regulated pneumatic suspension system, an active roll compensation system, an active chassis system (e.g., a system that can generate active suspension forces), or other suspension systems familiar to one having ordinary skill in the art.

According to an exemplary embodiment, a suspension system comprises at least one adjustable damping device. The damping device may be, for example, a shock absorber, a vehicle spring, at least one device that acts like a shock absorber and/or a vehicle spring, or other damping device familiar to one having ordinary skill in the art. The damping device may be controllable by a control signal (e.g., a control signal issued by a controller of a vehicle suspension system), such that a damping characteristic of the damping device can be dynamically adjusted. The control signal can be generated on the basis of current driving dynamics data, which may be detected by one or more vehicle sensors, and/or on the basis of optically recorded information about an area of a ground surface obtained by a visual system of a vehicle. According to an exemplary embodiment, a visual system used with a suspension system comprises, for example, a camera and/or a LIDAR device or other optical system used for optical recognition of an object that is familiar to those having ordinary skill in the art. Light or laser radiation emitting systems are also known as LADAR arrangements.

Figure 1:
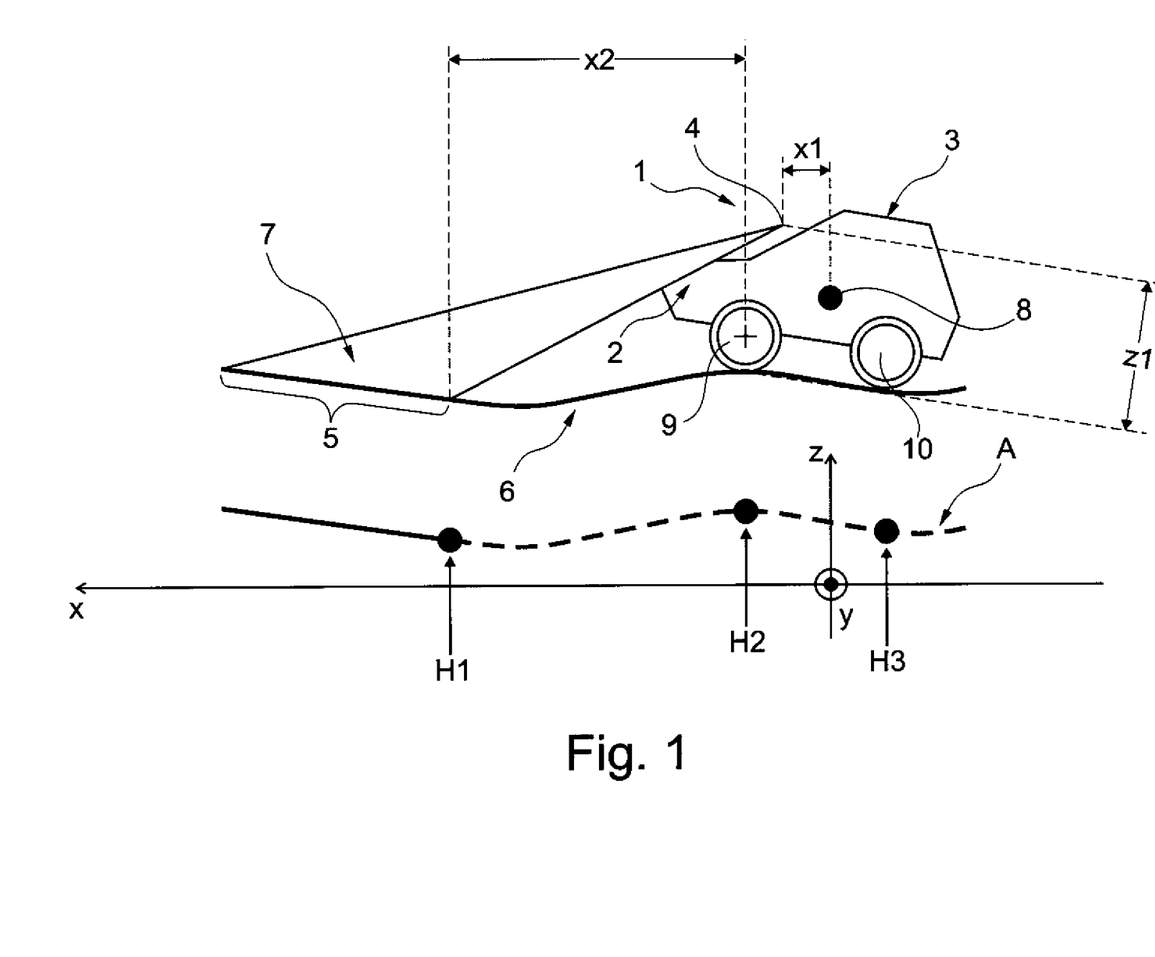
FIG. 1 schematically depicts a visual system of a vehicle, according to an exemplary embodiment of the present disclosure.

Turning to the drawings, FIG. 1 depicts a side view of an exemplary embodiment of a visual system 1 of a vehicle 3. The visual system 1 can be located, for example, in the front region of the vehicle 3, such as in the windshield region or on a hood 2 of the vehicle 3. The visual system 1 may be, for example, a camera system. The visual system 1 contains at least one sensor 4 (e.g., a camera sensor) to optically record the environment in front of the vehicle 3. According to an exemplary embodiment, the visual system 1 may comprise a sensor 4, such as a camera, so that information about the depth of the environment in front of the vehicle 3 can be recorded. Other numbers of sensors 4 may be used, such as when two sensors 4 (e.g., two cameras) are used for a stereo system. The depth matrix that can be generated in this way may be used, for example, to detect unevenness of a ground surface, such as elevations and depressions in specific regions of a region of road disposed in front of the vehicle 3. As an alternative or in addition, the visual system 1 can be a LIDAR (which may stand for "light detection and ranging") arrangement or a LADAR arrangement that includes sensor 4. The visual system 1 may be configured such that only a ground surface 5 located within a detection region 7 of the visual system 1 is observed and optically recorded by the visual system 1. According to an exemplary embodiment, a portion of ground surface 5 within detection region 7 is, for example, about 0.15 m in width at a range of, for example, about 4 m to about 15 m in front of a vehicle.

The visual system 1 is connected to a controller (not shown) configured to control the suspension system (not shown) of the vehicle 3. The connection between the visual system 1 and the controller can be, for example, a physical connection, such as a wired connection, or the connection can be a wireless connection. In the orientation depicted in FIG. 1, the visual system 1 faces forward in a direction of travel x of the vehicle 3.

The visual system 1 is provided in order to carry out range or depth measurements between at least one sensor 4 of the visual system 1 and an area of a ground surface 5 of the ground 6 in front of the vehicle 3. For this purpose a detection region 7 of the visual system 1 (e.g., of the sensor 4) is directed towards an area of a ground surface 5 in front of the vehicle 3. The detection region 7 contains a depth in the direction of travel x and a breadth in a lateral direction y of the vehicle 3. The ground 6 may be, for example, a highway or a road, or may be rough terrain, such as when vehicle 3 is operated off-road.

The visual system 1 may be located at a fixed height z1 relative to the ground 6, such as along a vertical direction z, and at a distance x1 from a center of gravity 8 of the vehicle 3, so that visual system 1 can record images of the environment in front of the vehicle 3. Continuous or parallel images of the visual system 1 obtained in this way may be used to estimate the average height of the ground 6 within the respective area of a ground surface 5. By grouping all the average points of the area of a ground surface 5, vectors between them may be combined to construct a common relative height profile, according to an exemplary embodiment.

In the case of a forward moving vehicle 3, the height profile A of the ground surface 5, which may continuously vary, that is generated covers the respective precalculated path of the front wheels 9 of the vehicle 3. A distance x2 of the detection region 7, or of the relevant points of the area of a ground surface 5 detected therein, relative to the front wheels 9 of the vehicle 3 may be used to estimate when the ground surface 5 or the respective points in the detection region 7 are reached, such as by the front wheels 9.

FIG. 1 demonstrates that a generated height profile A is substantially adjusted to the real profile of the schematically illustrated ground 6. Whereas a height point H1 is still within the detection region 7 of the visual system 1, other relevant height points H2, H3 are outside of the detection region 7 and have already been reached by the moving vehicle 3 (e.g., by front wheels 9 and rear wheels 10). Height point H2 may be a hump in the ground 6, which is now in contact with at least one front wheel 9. The vehicle suspension system, such as a damping device (not shown) associated with one or both of the front wheels 9 of the vehicle 3 may be controlled, such as via control of the damping characteristic of the damping device, based on information about the area of a ground surface 5 to be travelled that was previously optically recorded by the visual system 1. For example, damping devices associated with each of the front wheels 9 may be pre-adjusted (e.g., via the controller for the suspension system) on the basis of optically recorded information obtained by the visual system 1 for when front wheels 9 encounter height point H2 (e.g., a hump in the ground 6). As a result, the suspension system provides a faster response to real conditions, and the stability, safety, and ride comfort of the vehicle are enhanced. Furthermore, a height point H3 may be, for example, a depression in the ground 6 that is encountered by at least one rear wheel 10 of the vehicle 3. Damping devices associated with the rear wheels may be controlled in a similar manner to damping devices of the front wheels, such as to pre-adjust the vehicle suspension for the rear wheels. Thus, the vehicle suspension may be controlled to provide a desired rolling behavior.

Figure 2:
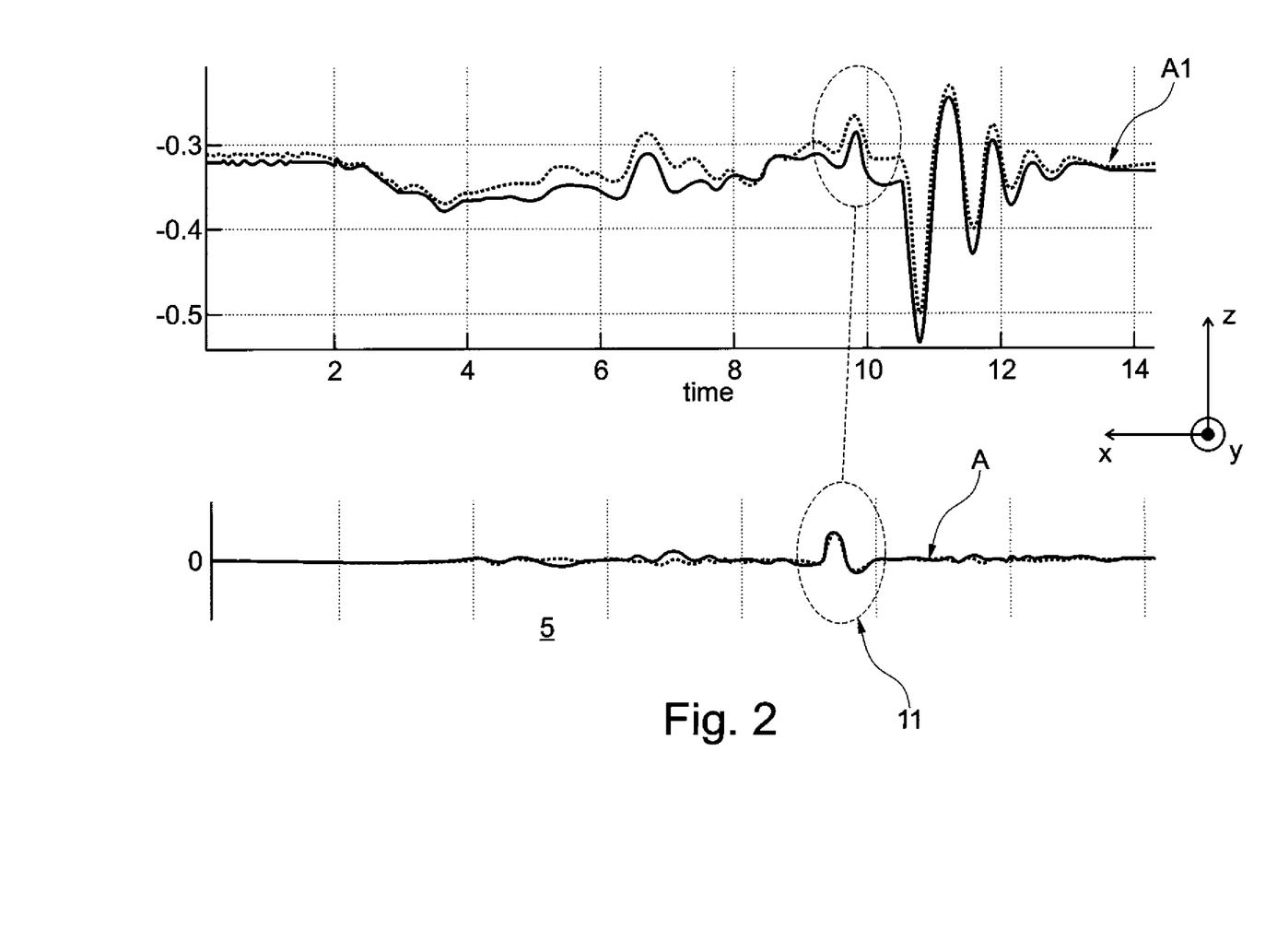
FIG. 2 shows an exemplary illustration of a relative height profile, determined from an image of a visual system in accordance with the present teachings, in relation to a ground surface to be travelled by a vehicle.

FIG. 2 depicts a measure for obtaining realistic information about the respective area of a ground surface 5, according to an exemplary embodiment. Because the visual system 1 may be fixed onto the vehicle 3, the visual system is subjected to corresponding positional disturbances due to motion of the vehicle body the visual system 1 is connected to. For instance, at least the structure of the travelling vehicle 3 is subject to some movements, such as movements resulting from travelling over the ground 6. Even if the visual system 1 contains mechanical compensation (e.g., mechanical vibration damping devices) for these inevitable positional disturbances, the present disclosure contemplates a synchronous displacement of the visual system 1 together with the structure of the vehicle 3.

In view of the possible disturbances to the visual system, optical information obtained about the ground 6 by the visual system 1 may be reprocessed, according to an exemplary embodiment. For example, the height profile initially obtained via the visual system 1 is a relative height profile A1, as depicted in the upper region of FIG. 2. As shown in the upper region of FIG. 2, the height profile has a dynamic profile in the vertical direction z, because the height profile has been influenced by the respective movements of the vehicle 3. The relative height profile A1 may be reprocessed to compensate for the movements of the visual system 1. Reprocessing may support the extraction of the absolute height profile A, which is depicted in the lower region of FIG. 2, which in turn may be used to control a vehicle suspension system. In order to achieve this, a suitable reprocessing algorithm is therefore used for compensation of the movements of the visual system 1.

The absolute height profile A, which is depicted in the lower region of FIG. 2, may be based on the real profile of the recorded area of a ground surface 5 in front of the vehicle 3. Thus, the vehicle (e.g., vehicle 3 of FIG. 1) may be travelling over a bump (corresponding to area 11 in the lower region of FIG. 2) on a flat area of a ground surface 5 in the direction of travel x. As mentioned above, the upper region of FIG. 2 shows the recorded profile of the relative height profile A1. Because of the movements (e.g., pitch, roll, vertical movements) of the vehicle 3 or its structure, the actual bump 11 may be detected with difficulty, as shown by the corresponding area 11 in the upper region of FIG. 2. By reprocessing the data of the relative height profile A1 into the absolute height profile A, the bump 11 be properly identified and the vehicle suspension system can be controlled appropriately.

As already explained, the preliminary evaluation of the true condition of the ground to be travelled 6 takes place for a distance x2 in front of the vehicle 3, wherein the distance x2 can be fixed or variable. While travelling, a displacement speed vector (longitudinal speed in the direction of travel x and lateral speed in the lateral direction y) of the vehicle 3 may change constantly, such as due to how a person is steering the vehicle 3. Thus, the time to reach the respective height point H1-H3 also varies. In view of this, the speed of the vehicle 3 and the optically recorded information about the area of a ground surface 5 may be monitored such that the respectively missing height points between the detection region 7 of the visual system 1 and the respective associated front and/or rear wheel 9, 10 of the vehicle 3 may be reconstructed via calculation.

Independently of the information about the area of a ground surface 5 optically recorded by the visual system 1, the four inputs of the ground 6 on the front and/or rear wheels 9, 10 of the vehicle 3 MAY also be used to calculate the respective control signal for the associated damping device. According to an exemplary embodiment, the inputs are current driving dynamics data detected by one or more sensors. The sensors may be, for example, displacement and/or acceleration sensors disposed in or on the damping device associated with a wheel of the vehicle 3. The driving dynamics data may include other types of driving data, such as, for example, the lateral acceleration of the vehicle 3 and/or other types of vehicle driving dynamics data. The aim of using the data is to minimize and/or reduce the effect of any roughness of the ground 6 on the structure of the vehicle 3 and the suspension movements of the front and/or rear wheels 9, 10.

Figure 3:
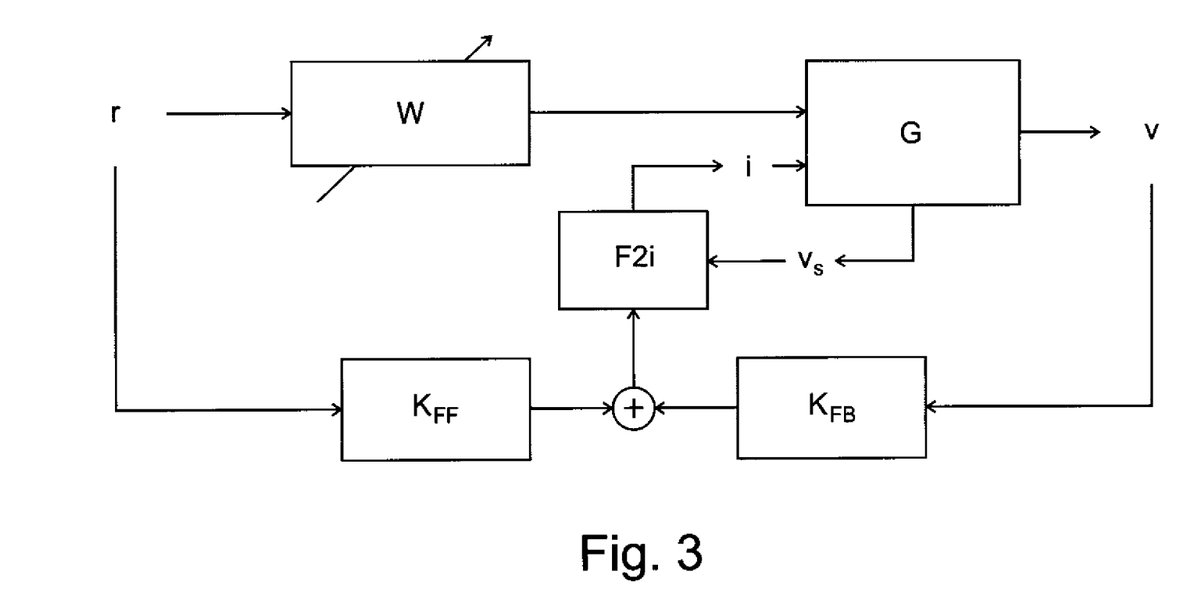
FIG. 3 schematically depicts a control system for a suspension of a vehicle, according to an exemplary embodiment.

FIG. 3 depicts a process to control a vehicle suspension system, according to an exemplary embodiment. Movements of the travelling vehicle 3, especially the displacement speed v of its structure, are initially estimated as driving dynamics data v. A first control term $K_{FB}$ is calculated using the driving dynamics data v, which is input to the calculation function F2i of a controller that generates a control signal i used to control a vehicle suspension system G, such as one or more respective damping device of the vehicle 3. According to an exemplary embodiment, output from one or more accelerometers and/or gyroscopes may be used as driving dynamics data v to calculate the first control term $K_{FB}$. Feedback from the suspension system G (e.g., feedback from one or more sensors measuring suspension deflection, such as sensors measuring damping device deflection) in the form of at least one damping speed vector $v_S$ may also be input to the calculation function F2i of the controller, so that a control loop for the control signal i is established.

According to an exemplary embodiment, a second control term $K_{FF}$ is calculated on the basis of optically recorded information (e.g., an area of a ground surface 5 in FIG. 1) obtained by a visual system of the vehicle, which is input to the calculation function F2i of the controller for generating the control signal i. For example, a height value r, such as the absolute height profile A discussed above, may be used as to generate the second control term $K_{FF}$ as an input to the calculation function F2i for generating a control signal i for controlling the vehicle suspension system G, in addition to the first control term $K_{FB}$.

According to an exemplary embodiment, the first control term $K_{FB}$ and the second control term $K_{FF}$ may be used as inputs to the calculation function F2i to minimize a rough ride due to respective cornering speeds of the vehicle structure and the movements of the front and/or rear wheels 9, 10, as well as due to the contact of front and/or rear wheels 9, 10 with a ground surface under the following input conditions:

$$C(i)v_S = K_{FB}(v) + K_{FF}(r)$$

Here, r may represent respective height points H1-H3 of the absolute height profile A in FIGS. 1 and 2. The height points H1-H3 may have height values that deviate from one another, as indicated in FIG. 1. The time to reach respective height points H1-H3 may be used to control the vehicle suspension system G, such as to pre-adjust the suspension system G and/or control the suspension system G when vehicle wheels 9, 10 reach the respective height points H1-H3 observed by the visual system 1. According to an exemplary embodiment, the suspension system G may be configured to adjust the vehicle suspension, such as the damping characteristic of one or more damping devices, when the height point r is input to the suspension system G. In order to control the suspension system G at the time the vehicle wheels 9, 10 reach the respective height points, the suspension controller may include a time varying delay, such as a function W, to control when the height point r is input as a control to the suspension system G. The function W may be adjusted to vary the time at which the height point r is input as a control to the suspension system G, such as by varying the function W as vehicle speed varies. The function W may be, for example, a Laplace transform, used to delay to the input of a height point r to the suspension system G. For example, the function W may have the form of $e^{-T(u)s}$, with T representing a time delay and u representing vehicle speed.

Figure 4:
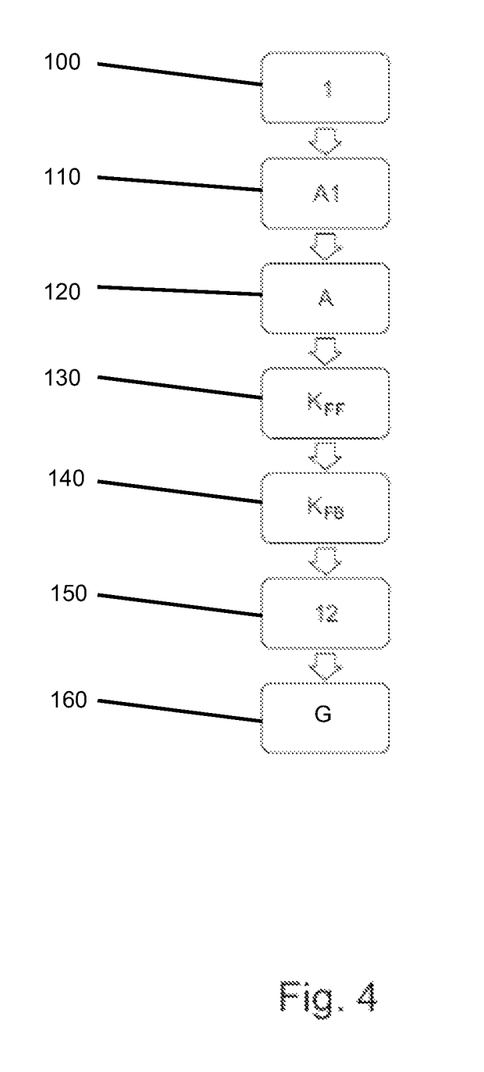
FIG. 4 schematically depicts a method for using a suspension system of a vehicle, according to an exemplary embodiment.

FIG. 4 depicts a method for the operation of the suspension system G, according to an exemplary embodiment. In step 100, images are acquired by the visual system 1 and used in step 110 to calculate the relative height profile A1 of the area of a ground surface 5, such as a specified path of vehicle front wheels 9. In step 120, an absolute height profile A is calculated by reprocessing the relative height profile A1. Step 120 may be combined with step 110, such as, for example, depending on the visual system and the processing algorithm used. The first control term $K_{FB}$ and second control term $K_{FF}$ are calculated in steps 130, 140, such as by calculating the first control term $K_{FB}$ on the basis of current driving dynamics data v obtained from one or more vehicle sensors and the second control term $K_{FF}$ on the basis of the optically recorded information obtained by the visual system 1. An appropriate force-control demand signal 12 (e.g., control signal, such as control signal i in FIG. 4) is determined in step 150 and input to the vehicle suspension G in step 160, such as to one or more adjustable damping devices of the suspension system G. According to an exemplary embodiment, information about the respective area of a ground surface 5 to be travelled by a vehicle, which has been previously obtained from images of the visual system 1, is input to the suspension system G by means of driving dynamics data v.

Figure 5:
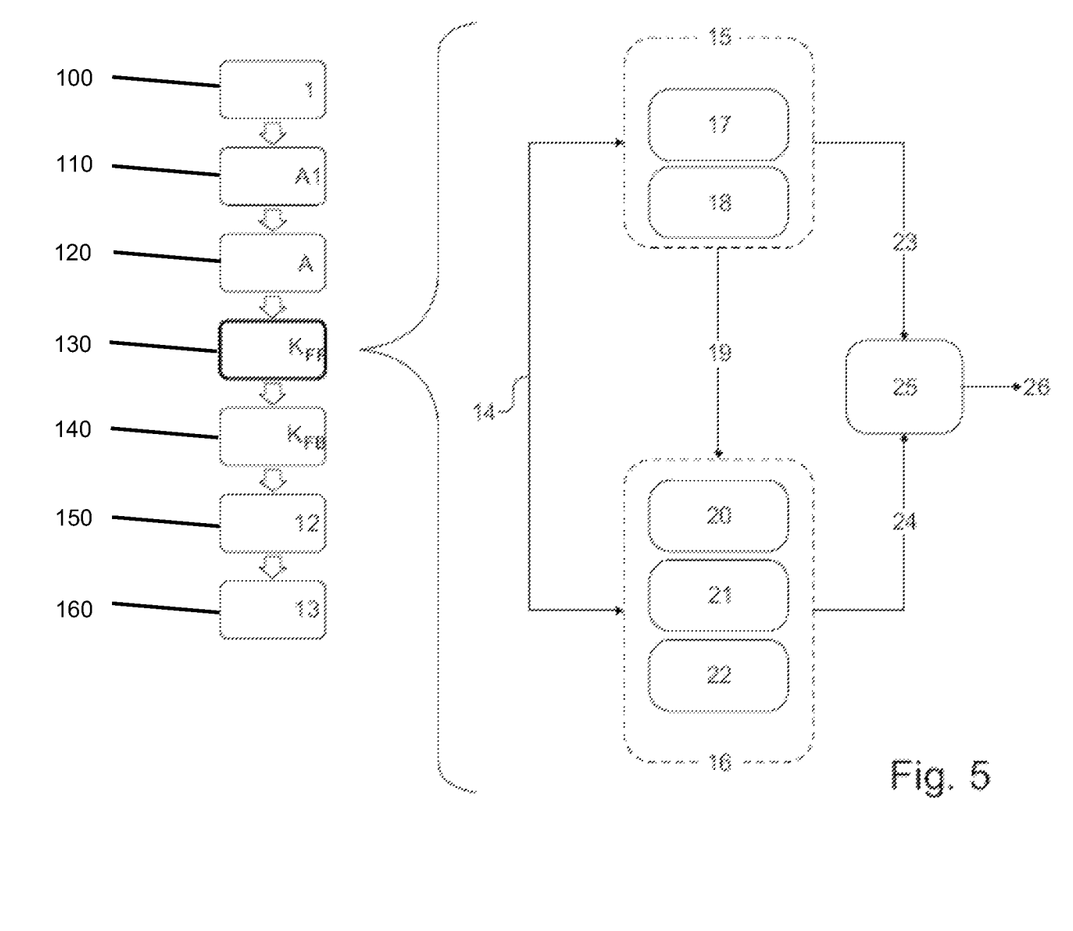
FIG. 5 schematically depicts the calculation of the second control term, according to an exemplary embodiment.

FIG. 5 depicts an exemplary method for calculating the second control term $K_{FF}$ for the method of FIG. 4. For this purpose, any road height vector points 14 of the individual wheels 9, 10 on the respective ground 6 currently being travelled are initially detected. The road height vector points for each wheel 14 are used as input variables for the calculation of a preliminary evaluation model 15 regarding expected road characteristics and a damping force preliminary evaluation 16. The preliminary evaluation model 15 contains an event-based detection 17 and a corresponding continuous suspension model 18. Any detected events and/or structural speeds 19 of the vehicle, based on the preliminary evaluation-model 15, are input to the damping force preliminary evaluation 16. The damping force preliminary evaluation 16 includes an event-based, shifted damping force query 20, a continuous damping force query 21, and an evaluator 22 for the damping force preliminary evaluation 16.

Based on the preliminary evaluation model 15, vehicle suspension rates 23 are calculated for one or more vehicle wheels 9, 10, while the damping force preliminary evaluation 16 independently outputs preliminary evaluation damping forces 24 for the one or more vehicle wheels 9, 10.

According to an exemplary embodiment, both the independent preliminary evaluation damping forces 24 and the suspension rates 23 are input to a preliminary evaluation quadrant check 25, which outputs a control value 26, such as for the damping characteristic of a damping device, from which the second control term $K_{FF}$ can be based.

Depending on the respective application, the various exemplary embodiments described herein provide enhanced control of a vehicle suspension system, such as a suspension system with an active damping device 13, in comparison with conventional suspension control means. According to an exemplary embodiment, the damping device may use an appropriately higher or lower forces and bandwidth to provide additional enhancement of the suspension control.

Figure 6:
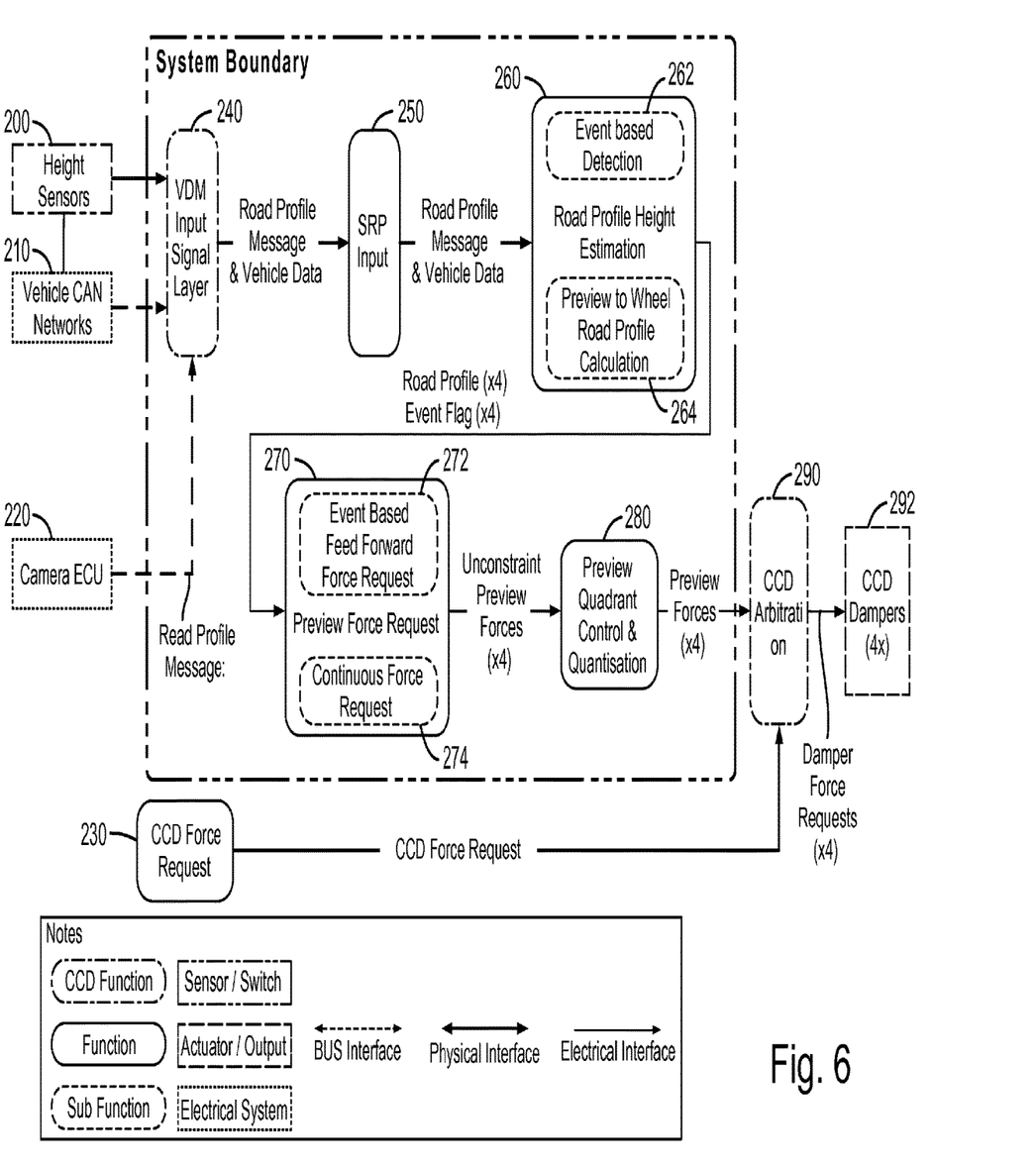
FIG. 6 schematically depicts a control system for a suspension of a vehicle, according to another exemplary embodiment.

The present disclosure contemplates other configurations for a controller of a vehicle suspension system. FIG. 6 schematically depicts a control system for a suspension of a vehicle, according to another exemplary embodiment. Signals from one or more vehicle sensors, such as height sensors 200, are input to a VDM input signal layer 240, which may be a function of a continuous control damper (CCD) control system. Data from a vehicle controller area network (CAN) 210 and/or data from a camera ECU 220 may be input to the VDM input signal layer 240, as indicated in FIG. 6. A road profile message and vehicle data is output from the VDM input signal layer 240 to a suspension road preview (SRP) function 250, which outputs a road profile message and vehicle data to a road profile height estimation function 260. Road profile height estimation function 260 may include an event based detection subfunction 262 and a preview to wheel road profile calculation subfunction 264. A road profile and event flag is output from the profile height estimation function 260, such as, for example, a road profile and event flag for each vehicle wheel, and input to a preview force request function 270. The preview force request function 270 may include an event based feed forward force request subfunction 272 and a continuous force request subfunction 274. The preview force request function 270 outputs an unconstrained preview force to a preview quadrant control and quantization function 280. An unconstrained preview force may be provided, for example, for each vehicle wheel. Preview forces, such as for each vehicle wheel, are output from the quadrant control and quantization function 280 to a CCD arbitration function 290. The CCD arbitration function 290 may also receive a CCD force request 230 as input, as indicated in FIG. 6. The CCD arbitration function 290 outputs a damper force request, such as a damper force request for one or more damping devices of a suspension system that are schematically represented by CCD dampers 292 in FIG. 6.

Further modifications and alternative embodiments will be apparent to those of ordinary skill in the art in view of the disclosure herein. For example, the systems and the methods may include additional components or steps that were omitted from the diagrams and description for clarity of operation. It should be noted that the features set out individually in the present disclosure can be combined with each other in any technically advantageous manner and provide other embodiments. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed:

1. A method of controlling a suspension system for a vehicle, comprising:
inputting first control information based on current driving dynamics data to a controller for the suspension system;
inputting second control information, based on optically recorded information about a ground surface area that the vehicle will travel captured by a visual system of the vehicle, to the controller for the suspension system;
applying, at the controller, a relative weighting to the first control information and the second control information based on an evaluation of the first control information and the second control information by the controller, the relative weighting ranging between
an equal weighting of the first control information and the second control information to
one of the first control information or the second control information having zero weight and the other of the first control information or the second control information having all weight;
generating a control signal with the controller, based on the first control information, the second control information, and the relative weighting of the first control information and the second control information; and
controlling, based on the control signal, at least one adjustable damping device of the suspension system to dynamically adjust a damping characteristic of the at least one damping device;
wherein the relative weighting applied to the second control information is reduced in response to determining that a view of the ground surface from the visual system was obstructed when the optically recorded information was captured.

2. The method as claimed in claim 1, further comprising:
estimating an expected displacement of a structure of the vehicle from the current driving dynamics data, and calculating the first control information on a basis of the expected displacement of the structure.

3. The method as claimed in claim 2, further comprising:
calculating an absolute height profile of the ground surface area from the optically recorded information; and
calculating the second control information using height points of the absolute height profile, wherein the height points have height values that deviate from one another.

4. The method as claimed in claim 3, wherein the absolute height profile is based on a previously calculated relative height profile, wherein the previously calculated relative height profile is reprocessed to obtain the absolute height profile to compensate for inherent movements of at least one of a structure of the vehicle and of movements of the vehicle.

5. The method as claimed in claim 3, further comprising calculating a time at which a wheel of the vehicle associated with the at least one damping device reaches a relative height point, wherein the calculated time depends on at least one of a direction of travel of the vehicle and a speed of the vehicle, wherein the second control information, at the time at which the wheel reaches the relative height point, is used to generate the control signal to control the at least one damping device.

6. The method as claimed in claim 4, further comprising:
obtaining the optically recorded information for the ground surface area at a detection region disposed in front of the vehicle; and determining a relative distance between the detection region and the vehicle.

7. The method as claimed in claim 1, further comprising reconstructing missing height points in the optically recorded information between a detection region disposed in front of the vehicle for the optically recorded information and a wheel associated with the at least one damping device.

8. The method as claimed in claim 1, wherein the adaptive suspension system is an adaptive air spring system.

9. The method of claim 1, wherein the evaluation of the first control information and second control information is based on a yaw rate indicated by the first control information.

10. The method of claim 1, wherein the evaluation of the first control information and second control information is based on a turning angle indicated by the first control information.

11. The method of claim 1, wherein the evaluation of the first control information and second control information is based on a determination, from the second control information, of height points of the ground surface area the vehicle will travel, the height points indicating a raised or recessed irregularity in the ground surface area.

12. A method of controlling a suspension system for a vehicle, comprising:
receiving, at a controller, a first input based on current driving dynamics data and a second input based on optically recorded information relating to a conditions of ground the vehicle will travel on captured by a visual system of the vehicle;
applying, at the controller, a relative weighting to the first input and the second input based on an evaluation of the first input and the second input at the controller, the relative weighting ranging between
an equal weighting of the first input and the second input to
one of the first input or the second input having zero weight and the other of the first input or the second input having all weight;
generating a control signal based on the first input, the second input, and the relative weighting of the first input and the second input; and
adjusting a damping characteristic of the at least one damping device based on the control signal, wherein the suspension system is an adaptive suspension system or an active roll control suspension system;
wherein the relative weighting applied to the second input is reduced in response to determining that a view of the ground surface from the visual system was obstructed when the optically recorded information was captured.

13. A suspension system, comprising:
an optical system recording ground conditions of a ground surface are that the vehicle will travel on;
an adjustable damping device, wherein the suspension system is an adaptive suspension system or an active roll control suspension system; and
a controller:
receiving a first input based on current driving dynamics data and receiving a second input based on information recorded by the optical system,
applying a relative weighting to the first input and the second input based on an evaluation of the first input and the second input at the controller, the relative weighting ranging between
an equal weighting of the first input and the second input to
one of the first input or the second input having zero weight and the other of the first input or the second input having all weight, and
adjusting at least one characteristic of the damping device based on the first input, the second input, and the relative weighting of the first input and the second input;
wherein the relative weighting applied to the second input is reduced in response to determining that a view of the ground surface from the visual system was obstructed when the optically recorded information was captured.

* * * * *